DIGITAL COMPARATOR FOR BINARY-CODED DECIMAL SYSTEM

Filed June 15, 1959 2 Sheets-Sheet 1

INVENTORS
MYRON J. MENDELSON
CHARLES J. KRAUSE
BY Henry L. Shenier
ATTORNEY

May 22, 1962 M. J. MENDELSON ET AL 3,035,770

DIGITAL COMPARATOR FOR BINARY-CODED DECIMAL SYSTEM

Filed June 15, 1959 2 Sheets-Sheet 2

INVENTORS
MYRON J. MENDELSON
CHARLES J. KRAUSE
BY [signature]
ATTORNEY 3,035,770

DIGITAL COMPARATOR FOR BINARY-CODED DECIMAL SYSTEM

Myron J. Mendelson, Los Angeles, and Charles A. Krause, Gardena, Calif., assignors to United Aircraft Corporation, East Hartford, Conn., a corporation of Delaware Filed June 15, 1959, Ser. No. 820,465
6 Claims. (Cl. 235—177)

Our invention relates to a digital comparator for a binary-coded decimal system and more particularly to a device for comparing two binary-coded decimal representations to produce an output signal representing the difference between the representations.

Digital servomechanisms for use in machine tool controls, fire control systems, gyroscope stabilization systems, and in other similar applications have the theoretical advantages over analogue servomechanisms of being more accurate, more versatile, and more easily programmed to achieve the desired control. The copending application of Charles A. Krause et al., Serial No. 716,170, filed February 19, 1958, discloses a digital comparator and digital-to-analogue converter for comparing two binary-coded representations to produce an output signal which is an analogue difference between the quantities represented. The system disclosed in that application operates in the straight binary system. As is pointed out in the copending application, the low order section of the comparator may be modified to operate in a binary-coded decimal system merely by changing the relative weights of certain resistance elements in the section. While the copending application suggests that the high order section of the comparator may be modified to operate in a binary-coded decimal system, the application discloses no means by which this may be accomplished.

We have invented a digital comparator for use in a binary-coded decimal system to produce an analogue of the difference between two binary-coded decimal representations. Our system operates continuously so that no discontinuity appears in the output to its error signal channel. Our device utilizes stored digital information directly without requiring auxiliary apparatus for converting the digital information to analogue form. Our converter is simple, inexpensive, and highly reliable for the desirable results achieved.

One object of our invention is to provide a digital comparator for use in a binary-coded decimal system to produce an analogue of the difference between two binary coded decimal representations.

Another object of our invention is to provide a continuously operating digital comparator for use in a binary-coded decimal system.

A further object of our invention is to provide a digital comparator for use in a binary-coded decimal system to produce an output in which no discontinuity exists between the input and the output to the error channel of the system with which our comparator is used.

Yet another object of our invention is to provide a digital comparator for use in a binary-coded decimal system which is capable of utilizing stored digital programming information without requiring auxiliary conversion apparatus.

A still further object of our invention is to provide a digital comparator for use in a binary-coded decimal system which is simple, inexpensive, and reliable for the result achieved by the device.

In general our invention contemplates the provision of a digital comparator for use in a binary-coded decimal system and having a high order section which produces decision signals for controlling both the low order section of the comparator and the output of the system to give proportional control over a desired range and a constant control outside that range. The high order section of our comparator includes a number of groups of logic circuit components corresponding to the number of digits in the decimal number. Each group includes a number of components, corresponding to the number of bit places in the representation of a digit, to which we apply the bits and complements representing the digit. We arrange the high order section of our comparator so that once a decimal difference of 1 has been sensed in a high order digit place, the comparator maintains a path for the resulting difference signal only as long as a 0 appears opposite a 9 in the high order digit places of lesser significance. For other situations the high order section of our comparator operates in a manner similar to that of the high order section of the comparator disclosed in the copending application referred to hereinabove. The low order section of our comparator is analogous to the corresponding section of the comparator disclosed in the copending application.

In the accompanying drawings which form part of the instant specification and which are to be read in conjunction therewith and in which like reference numerals are used to indicate like parts in the various views.

Figure 1:
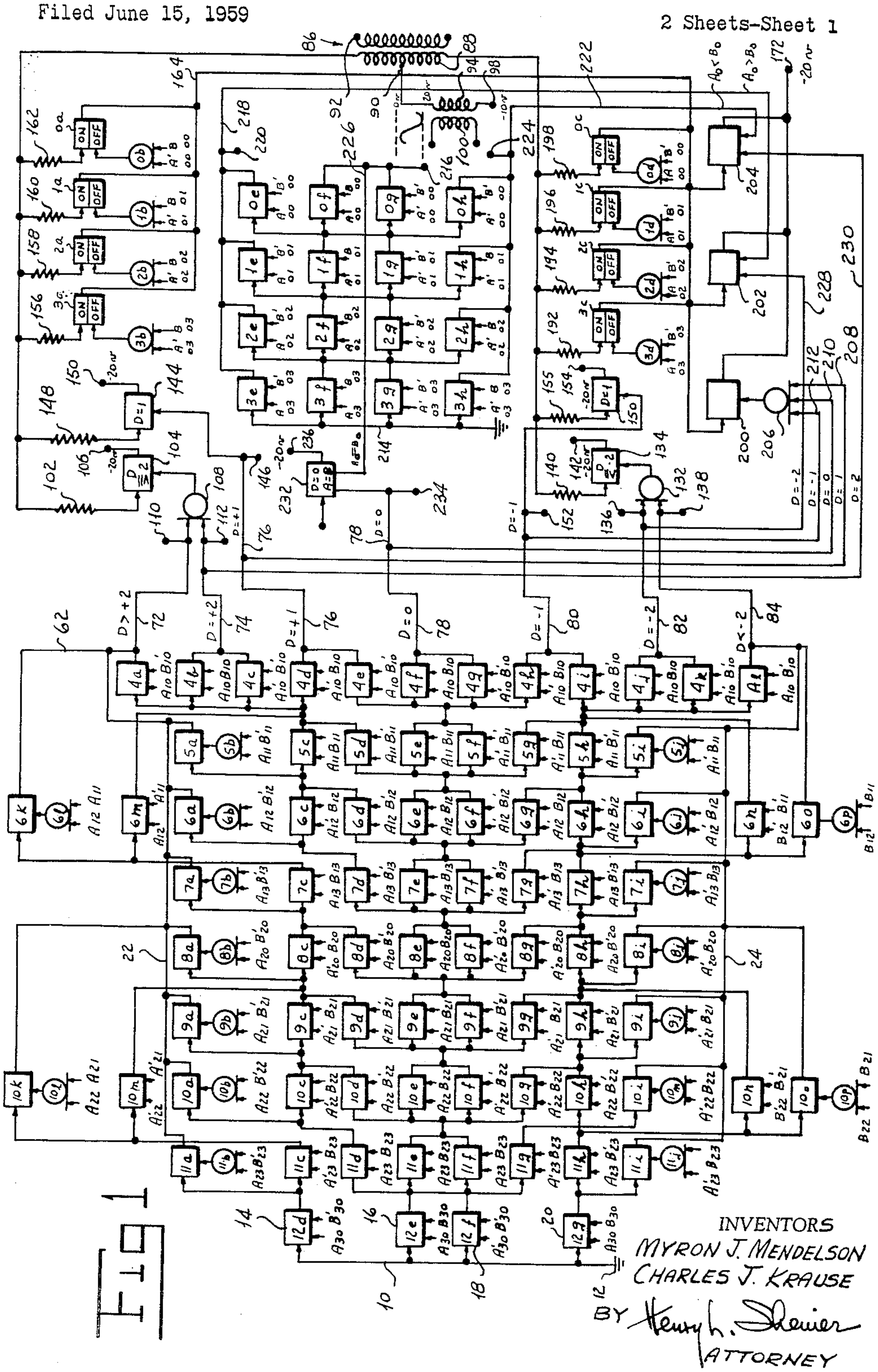
FIGURE 1 is a schematic view of one form of our digital comparator for use in a binary-coded decimal system.

As has been explained hereinabove, the digital comparator disclosed in the copending application operates in the natural binary system in order to accomplish the comparison in the high order section. The device disclosed in that application provides a path for a difference signal representing a difference of 1 in any binary place only so long as a 1 appears opposite a 0 in binary places of lesser significance. This operation can readily be demonstrated by considering a determination of the difference $$A-B=0000\ldots1$$

between two binary numbers $$A=A_{12}A_{11}A_{10}A_9\ldots A_0=10000\ldots0$$

and $$B=B_{12}B_{11}B_{10}B_9\ldots B_0=01111\ldots1$$

It will be obvious from a comparison of the members A and B that the path for the difference of 1 in any binary place continues in places of lesser significance so long as a 1 appears opposite a 0 in the place of lesser significance.

An analogous situation in the binary-coded decimal system to that described hereinabove would be the subtraction of the number $B=4999\ldots9$ from the number $A=5000\ldots0$ to produce a difference $A-B=0000\ldots1$. Since in the binary-coded decimal system a 1 no longer appears opposite a 0 in places of lesser significance following a difference of 1 in a place of a certain significance, where the difference between the numbers is 1, it is apparent that the comparator disclosed in the copending application cannot function in the decimal system. That is, in the decimal system once a difference of 1 has been determined, this difference must be carried through places of lesser significance as long as a 0 appears in the number A opposite a 9 in the number B. Since the binary-coded representation of a 9 is 1001 and not 1111, the comparators of necessity differ.

The simplest solution to the problem outlined hereinabove is the provision of a decimal code in which 1111 represents 9 and 0000 represents 0. Such a code would obviate the problem outlined hereinabove but would introduce so complex a problem of mechanization as to make the solution entirely unsatisfactory. We have devised a simple solution to the problem of providing a comparator which operates in the binary-coded decimal system.

Let us consider the determination of a 0 in the A number opposite a 9 in the B number after a difference of 1 has been determined in the place of next higher significance. We are comparing the group of binary bits 0000 of the A digit with the group of bits 1001 for the B digit. The first bit pair of the groups is identical to the first bit pair of a comparator operating in the natural binary system in which we are comparing 0000 with 1111. If this bit pair does not occur, then the difference is greater than 1, and the problem is obviated. If this first bit pair does occur, we may or we may not have a 0 opposite a 9. In the binary-coded decimal system, since only the digits 8 and 9 have a 1 in the binary place of greatest significance, then we know that the B digit is either an 8 or a 9. The next-to-most and next-to-least bits of both numbers 8 and 9 both are 0 so that where the first bit of the B digit is a 1 the next two bits of the B digit must be 0. It remains only to determine that the next-to-most and next-to-least bits of the A digit also are 0, and then we may return to a normal binary comparison to establish the fact that the last bit in the A digit is a 0, and the last bit in the B digit is a 1, as is also the case where binary numbers are being compared. If, of course, either one of the next-to-most and next-to-least significant bits of the A digit are 1, we know that the difference is greater than 1.

Referring now to FIGURE 1 of the drawings, we connect a conductor 10 between a suitable return potential such as ground 12 and the input terminal of a number of logic circuit components 14, 16, 18 and 20. The nature of each of the components 14, 16, 18, and 20 is such that with inputs present at both the input terminals of any one of the components the component conducts, and, in the arrangement shown, its output terminal is connected to ground.

We have shown a form of our comparator in which the maximum value of the numbers A and B is 1999. In binary-coded decimal form the number A can be represented as $$A=A_{30}\ A_{23}A_{22}A_{21}A_{20}\ A_{13}A_{12}A_{11}A_{10}\ A_{03}A_{02}A_{01}A_{00}$$

Similarly the number B can be represented as $$B=B_{30}\ B_{23}B_{22}B_{21}B_{20}\ B_{13}B_{12}B_{11}B_{10}\ B_{03}B_{02}B_{01}B_{00}$$

It is to be understood that in our system we have chosen to let a binary 1 in our system be represented by a negative potential of, for example, twenty volts, while a binary 0 is represented by ground potential. We have designated the complement of any binary bit such, for example, as the bit $A_{23}$ by a primed reference letter as $A_{23}'$.

We have assumed that in the system with which our converter is used, proportional control for a range of differences of the binary coded decimal representations from −20 to +20 is adequate. With this in mind we have divided the number A, for example, into higher order part $A_D$ including higher order digits $A_3A_2A_1$ and a lower order digit $A_0$. Similarly the B number is divided into a higher order part $B_D$ including higher order digits $B_3B_2$ and $B_1$ and a lower order digit $B_0$. We have indicated a difference D between the representations of ±10 as being $D=\pm 1$. From this it follows that a difference of ±20 may be represented as $D=\pm 2$. Further, if the difference between the representations A and B is between +10 and −10, then $D=0$. In this last case, of course, it may happen that $A_0<B_0$, $A_0=B_0$, or $A_0>B_0$.

From the description given hereinabove it will be apparent that the maximum difference which can occur in the most significant or $A_3$ and $B_3$ digit place is 1, since the digits in this place are represented by only a single bit. We employ the bits of this place to control the operation of the elements 14, 16, 18, and 20. For purposes of clarity we have indicated the bits and complements applied to the control terminals of these elements immediately below the elements in FIGURE 1. We have followed this system with the remaining logic components to be described hereinafter. Since the components 14, 16, 18, and 20 as well as the rest of the components of our comparator are described in detail in the copending application referred to hereinabove, we will not describe them in detail.

We connect the output terminals of the component 14 to the input terminal of a gating circuit 11a adapted to be enabled in response to a signal applied to its control terminal. We connect the ouput terminal of a two-input OR circuit 11b to the control terminal of the circuit 11a. We also connect the output terminal of component 14 to the input terminal of a two-input AND circuit 11c having the complement and bit $A_{23}'$ and $B_{23}$ applied to its control terminals. We connect the output terminals of both components 16 and 18 to the input terminals of respective two-input AND circuits 11d to 11g having bits and complements applied to their control input terminals in the manner indicated in FIGURE 1. We connect the output terminal of component 12g to the input terminals of a two-input AND circuit 11h controlled by the bit and complement $A_{23}$ and $B_{23}'$ and a gating circuit component 11i controlled by a two-input OR circuit 11j having the complement and bit $A_{23}'$ and $B_{23}$ applied to its input terminals.

From the structure described thus far it will be apparent that for the most significant digit of the numbers A and B the greatest possible difference is 1. Assuming that this difference is 1, then the group of components 11 operate in the same manner as do circuits of the comparator shown in the copending application to provide a path for the resulting difference signal. For example, if $A_{30}$ is 1 and $B_{30}$ is 0, component 14 continues to represent a difference of 1.

The circuit 11c determines that the A bit in the most significant place of the next digit representation is 0 and that the most significant bit of the representation of the B digit in the next place is 1, as is required for a continuing difference of 1. In the next bit place, however, rather than making the same comparison we determine whether or not the next two bits of the A digit are 0, as is required for a continuing difference of 1. We connect the output terminal of the component 11c to the input terminal of a two-input AND component 10m controlled by the complements $A_{22}'$ and $A_{21}'$.

It will be understood that, with a difference of 1 in the most significant decimal place, an overall difference of $D>+2$ exists if, in the next-to-most significant decimal place either the most significant bit of the A number is a 1 or the most significant bit of the B number is a 0. The components 11a and 11b account for this situation by coupling the output terminal of component 12d to a conductor 22 which may be considered the $D>+2$ line.

It will be remembered also that even where the comparison in the most significant bit place of the next-to-most significant digit indicates a continuing difference of 1, if either the next-to-most or next-to-least significant bit of the A number is a 1, then the overall difference $D>+2$. To account for this situation, we connect a gating circuit component 10k between the output terminal of component 11c and the conductor 22. A two-input OR circuit 101 controlled by the bits $A_{22}$ and $A_{21}$ controls the component 10k.

The portion of our comparator corresponding to the next-to-most significant decimal digit includes a plurality of other components designated as 10, 9, and 8 which are connected to operate in the normal binary manner. We connect the outputs of each pair of *e* and *f* components from 11e to 11f to 8e and 8f together. We connect the input terminals of each set *d*, *e*, *f*, and *g* components together. We connect the components 10e to 8e in series with each other between the common output of components 11e and 11f and the common input of components $7d$ to $7g$ of the most significant bit place of the next-to-least significant decimal digit. These two series connections provide paths for indicating a difference $D=0$ in the next-to-most significant decimal digit place.

We connect the output terminals of components 11$d$ to 9$d$ respectively to the inputs of series-connected components 10$c$ to 8$c$ and to the inputs of gating circuit elements 10$a$ to 8$a$ controlled respectively by two-input OR circuits 10$b$ to 8$b$. We connect the output terminals of the elements 10$a$ to 8$a$ to the conductor 22 corresponding to a difference $D>+2$.

We connect the output terminals of the two-input AND components 11$g$ to 9$g$ respectively to the input terminals of series-connected components 10$h$ to 8$h$ and to the input terminals of gating circuits 10$j$ to 8$j$. The output terminals of components 11$i$ to 8$i$ are connected to the conductor 24 indicating a difference $D<-2$.

From the connections thus far described it can be seen that at the output of the group of components 11 to 8 corresponding to the next-to-most significant decimal digit the conductor 22 represents a difference $D>+2$, an output at the output terminal of component 8$c$ or component 8$d$ represents $D=+1$, the output of components 8$g$ or 8$h$ represents $D=-1$ and the conductor 24 represents a difference of $D<-2$. For the next-to-least significant decimal digit we employ a group of components including components 7$a$ to 7$j$, 6$a$ to 6$p$, 5$a$ to 5$j$, and 4$a$ to 4$l$. We connect the output terminal of components 8$c$ and 8$d$ representing $D=+1$ to the input terminals of components 7$a$ to 7$c$. We connect the output terminals of components 8$e$ and 8$f$ which correspond to $D=0$ to the common input conductor of components 7$d$ to 7$g$. We connect the output terminals of components 8$g$ and 8$h$ indicating a difference corresponding to $D=-1$ to the common input terminals of 7$h$ and 7$i$. As was the case with the group of components corresponding to the next-to-most significant digit, we provide components 6$k$ to 6$p$ for the next-to-least significant digit for determining whether or not the next-to-most and next-to-least bits of the next-to-least significant digit of the A or B numbers, depending on which is the larger number, both are 0. The remaining components of the group corresponding to the next-to-least significant decimal digit are connected in a manner similar to those corresponding to the next-to-most significant digit. The group of components 4$a$ to 4$l$ have auxiliary components for determining when the difference is exactly 2.

We connect the output terminals of the components 4$a$ to 4$l$ to a number of conductors or decision lines 72, 74, 76, 78, 80, 82, and 84 corresponding respectively to $D>+2$, $D=+2$, $D=+1$, $D=0$, $D=-1$, $D=-2$, and $D<-2$.

The remaining portion of our comparator is the low order section which is similar in construction and operation to the low order section of the comparator disclosed in the copending application referred to hereinabove. This section of our comparator includes a transformer, indicated generally by the reference character 86, having a primary winding 88 provided with a center tap 90 and a secondary winding 92. We connect the secondary winding 94 of a transformer indicated generally by the reference character 96 between the center tap 90 and a terminal 98 of a source of negative potential which has a magnitude of, for example, ten volts. We apply a varying signal to the primary winding 100 of a transformer 96. This signal may, for example, be a 115 volt 60 cycle signal. The transformer 96 steps this voltage down to produce a sinusoidal voltage having a peak-to-peak swing of from +20 volts to −20 volts, for instance, at the center tap 90. We connect resistances of predetermined values into the circuits of the respective upper and lower halves of winding 88, as viewed in FIGURE 2, to produce a net flux which is the analogue of the difference between the numbers A and B over the range of difference of ±20, for instance, and a constant flux outside this range.

We connect a resistor 102 between one end terminal of winding 88 and the input terminal of a gate component 104, the output terminal of which is connected to the terminal 106 of a source of negative potential having a magnitude of, for example, twenty volts. A two-input OR component 108 has an output terminal connected to the control terminal of element 104. We connect the respective conductors 72 and 74 to the control input terminals of element 108. We also connect the input terminals of element 108 to respective terminals 110 and 112 providing a negative biasing potential of, for example, twenty volts. As has been explained hereinabove if a difference $D>+2$ exists, a circuit is complete through the logic circuit components from ground conductor 32 to conductor 72. Similarly, if a difference $D=+2$ exists, conductor 74 is connected to ground through the logic circuit components. If either of the two conditions described above occurs, the bias potential on one of the input terminals of element 108 is grounded and this element is activated to cause the component 104 to conduct. In this manner a circuit is complete from center tap 90 through the upper half of primary winding 88, through resistor 102 and through the element 104 to terminal 106 to cause a current flow through the upper half of primary winding 88. As will be explained hereinafter, resistor 102 has a value providing a current flow having a magnitude which is the analogue of a difference in the numbers of 20. Since this current flows upwardly through the primary winding, it induces a voltage in winding 92 of a polarity representing an error in the plus direction.

From the foregoing it will be seen that if $D=+2$, one or the other of conductors 72 and 74 will be connected to ground with the result that component 104 is rendered conductive to connect resistor 102 into the circuit of the upper half of primary winding 88.

We connect the two conductors 82 and 84 to the input terminals of a two-input OR circuit element 132 which is adapted to render a gate element 134 conductive when either of its input terminals is connected to ground. We also connect the input terminals of element 132 to respective terminals 136 and 138. Terminals 136 and 138 are connected in a reverse-biased sense through diodes to a source of minus twenty volts exactly as are terminals 110 and 112. We connect a resistor 140 having a resistance value equal to the value of the resistor 102 between the terminal of the lower half of winding 88 and the input terminal of component 134. We connect the output terminal of the element 134 to a terminal 142 of a source of negative potential having a magnitude of, for example, twenty volts. The elements 132 and 134 are similar in construction to the elements 108 and 104. As has been explained hereinabove, when the difference $D=-2$, one or the other of the conductors 82 and 84 is connected to ground to cause element 134 to conduct. When this occurs, a series circuit is complete from secondary winding 94, through the lower half of winding 88, through resistor 140 and through element 134 to terminal 142. This circuit provides a path for current to flow from the center tap 90 through the lower half of winding 88. Since the resistance of resistor 140 is equal to that of resistor 102, this current is equal in magnitude to the current flow when resistor 102 is connected in the circuit of the upper half of winding 88. It will be appreciated that current flow through the upper half of winding 88 is in the opposite direction to current flow through the lower half of winding 88 with the result that voltages of opposite polarity are produced in secondary winding 92 by these respective currents.

We connect the conductor 76 to the control terminal of a gate component 144 to render this component conductive when conductor 76 is connected to ground. As has been explained hereinabove, conductor 76 is grounded when $D=+1$ corresponding to an actual difference of 16 in the numbers A and B. We connect a terminal 146 through a reverse-biased diode to a source of negative biasing potential of a magnitude of, for example, twenty volts exactly as was done for either terminal 110 or terminal 112. We connect terminal 146 to conductor 76 leading to the control terminal of element 114 normally to render the element nonconducting. The details of construction of the element 144 are similar to those of the two elements 104 and 108 with the exception that no OR circuit is used in the input circuit of element 144. We connect a resistor 148 between the terminal of the upper half of winding 88 and the input terminal of element 144 and connect the output terminal of element 144 to the terminal 150 of a source of negative potential having a magnitude of, for example, twenty volts. When element 144 conducts, resistor 148 is in the circuit of the upper half of winding 88. We select the magnitude of resistor 148 to be substantially twice that of resistor 102 so that with only resistor 148 in the circuit, the magnitude of the current flow is half the magnitude of the current flow with resistor 102 in the circuit.

We connect the conductor 80 which is grounded when $D=-1$ to the control terminal of a gate component 150 which terminal also is connected to a terminal 152. We connect terminal 152 through a reverse-biased diode to a source of negative biasing potential of, for example, twenty volts in the same manner as terminals 110 and 112. When $D=-1$, corresponding to an actual difference of a magnitude of 16 with $A_D<B_D$ element 150 conducts to connect its input terminal to the terminal 154 of a source of negative potential having a magnitude of twenty volts. We connect a resistor 155 having a resistance substantially equal to that of resistor 148 between the terminal of the lower half of winding 88 and the input terminal of element 150. We connect a number of respective resistors 156, 158, 160, and 162 between the terminal of the upper half of winding 88 and the respective ON input terminals of a number of ON-OFF logic circuit components *3a* to *0a*. Respective two input OR logic circuit components have output terminals connected to the OFF control terminals of the components *3a* to *0a*. We feed the representations of the pairs of bits and complements $A_3'B_3'$ to $A_0'B_0'$ to the control terminals of components *3b* to *0b*. We connect the output terminals of components *3a* to *0a* to a common conductor 164 adapted to be connected to a negative potential of twenty volts in a manner to be described.

We connect respective resistors 192, 194, 196, and 198 between the terminal of the lower half of winding 88 and the respective ON input terminals of respective ON-OFF logic circuit components *3c* to *0c*. The output terminals of elements *3c* to *0c* are connected to conductor 164 which, as is explained hereinabove, is connected to the terminal 172 of a source of negative potential through auxiliary logic circuitry in a manner to be described. The output terminals of respective two-input OR logic circuit components *3d* to *0d* are connected to the OFF terminals of the respective components *3c* to *0c*. We apply the representations of the pairs of bits and complements $A_3B'_3$ to $A_0B'_0$ to the respective input terminals of the elements *3d* to *0d*. The components *3c* to *0c* and *3d* to *0d* are the same in construction details as are the respective components *3a* to *0a* and *3b* to *0b*. Further resistors 192, 194, 196, and 198 have the same respective resistance values as do the resistors 156, 158, 160, and 162.

As has been explained hereinabove in the form of our invention shown, we desire proportional control only when the difference between the numbers A and B is within the range from +20 to −20. The resistors 156, 158, 160, 162, 194, 196, and 198 have values to provide proportional control. Since we desire proportional control only when the difference is between +20 and −20, we disable the logic circuits of the resistors providing proportional control when the difference is outside this range. In order that conductor 164 be connected to the terminal 172 to permit the proportional control resistors to be placed in the circuit, one of a number of respective logic circuit components, 200, 202, or 204, must be rendered conductive. Each of the components 202 and 204 has a pair of control input terminals which are normally biased to render the element nonconductive. These components are of the same general nature in detail as those described hereinabove. Their construction is such that in order for them to be rendered conductive, both their input terminals must be connected to ground. The component 200, together with its control component 206, is analogous to the component 104 with its control component 108. We connect the input terminals of the elements 200, 202, and 204 to conductor 164 and connect the output terminals of these components to terminal 172. The element 200 is a gate circuit which is nonconductive unless its control input terminal, which is supplied by a three-input OR circuit 206, is connected to ground. Respective conductors 208, 210, and 212 connect the control input terminals of element 206 to the respective conductors 76, 78, and 80. Thus, when any one of the conductors 76, 78, and 80 corresponding respectively to $D=+1$, $D=0$, and $D=-1$, is connected to ground through the logic circuitry of the higher significance digits, component 206 causes element 200 to conduct to connect conductor 164 to terminal 172 to permit the proportional control resistors to be connected into the circuit. It will be appreciated that with the values of D corresponding to the conductors 76, 78, and 80, proportional control is obtained in our system.

There are two other cases in which we desire to provide proportional control. The first of these is where $D=-2$ and A is greater than B so that the actual difference is less than 20 in the negative direction. The second of these cases occurs when $D=+2$ and $A_0$ is less than $B_0$ so that the actual difference is less than 20 in the positive direction. It will be appreciated that in order to account for these situations we must produce an indication of $A_0$ greater than $B_0$ and $A_0$ less than $B_0$.

We connect the input terminals of a number of two-input AND components *3e* to *3h* to a ground conductor 214. We connect component *3f* in series with components *2f* to *0f* between conductor 214 and the terminal 216 which is connected through a reverse-biased diode to a source of negative potential having a magnitude of about twenty volts. We connect component *3g* in series with components *2g* to *0g* between conductor 214 and terminal 216. Our comparator includes two-input AND components, *2e* to *0e*, the output terminals of which, together with the output terminal of component *3e*, are connected to a conductor 218. We connect the terminal 220 through a reverse-biased diode to a source of negative twenty volt bias potential and to conductor 218. Our comparator includes components *2h* to *0h*, the output terminals of which, together with the output terminal of component *3h*, we connect to a conductor 222 to which we connect the terminal 224 which is connected through a reverse-biased diode to a source of minus twenty volts bias potential. We connect the output terminals of the respective pairs of components from the pair including *3f* to *3g* to the pair including *1f* to *1g* to the input terminals of the respective succeeding groups of components from the group including *2e* to *2h* to the group including *0e* to *0h*. We apply the representations of the respective pairs of bits and complements from $A_{03}B'_{03}$ to $A_{00}B'_{00}$ to the pairs of control input terminals of the respective components *3e* to *0e*. We apply the representations of the pairs of bits $A_{03}B_{03}$ to $A_{00}B_{00}$ respectively to the pairs of control input terminals of components *3f* to *0f*. We apply the representations of the pairs of complements from $A'_{03}B'_{03}$ to $A'_{00}B'_{00}$ respectively to the control input terminals of components *3g* to *0g*. We apply the representations of the respective pairs of bits and complements from $A'_{03}B_{03}$ to $A'_{00}B_{00}$ to the pairs of control input terminals of components $3h$ to $0h$.

From the foregoing it will be seen that if $A_0=B_0$, the bias on terminal 216 will be grounded and a conductor 226 connected to this terminal will be at ground potential. If $A_0>B_0$, the bias on terminal 220 will be grounded and conductor 218 will be at ground potential. Similarly, if $A_0<B_0$, the bias on terminal 224 will be grounded and conductor 222 will be at ground potential.

We connect a conductor 228 between the conductor 82 corresponding to $D=-2$ and one control terminal of component 202, the other control terminal of which we connect to conductor 218. Thus, with $D=-2$ and $A_0>B_0$ component 202 conducts to provide proportional control where the actual difference is less than two in a negative direction. A conductor 230 connects the conductor 74 corresponding to $D=+2$ to one terminal of logic element 204 to the other terminal of which we connect conductor 222. Thus, with $D=+2$ and $A_0<B_0$ in the circuit of the lower half of winding 88. In either case a constant control in the proper direction is generated. Within the range in which proportional control is required as where the difference $D=+2$ and $A_0<B_0$, where $D=-2$ and $A_0>B_0$, where $D=\pm 1$ and $A_0 \mp B_0$ and where $D=0$ and $A_0 \mp B_0$ certain of the resistors 156, 158, 160, and 162 are connected in the circuit of the upper half of winding 88 and certain of the resistors 192, 194, 196, and 198 are connected in the lower half of the winding 188 to provide a net flux in the transformer 86 which is the analogue of the required control signal.

Figure 2:
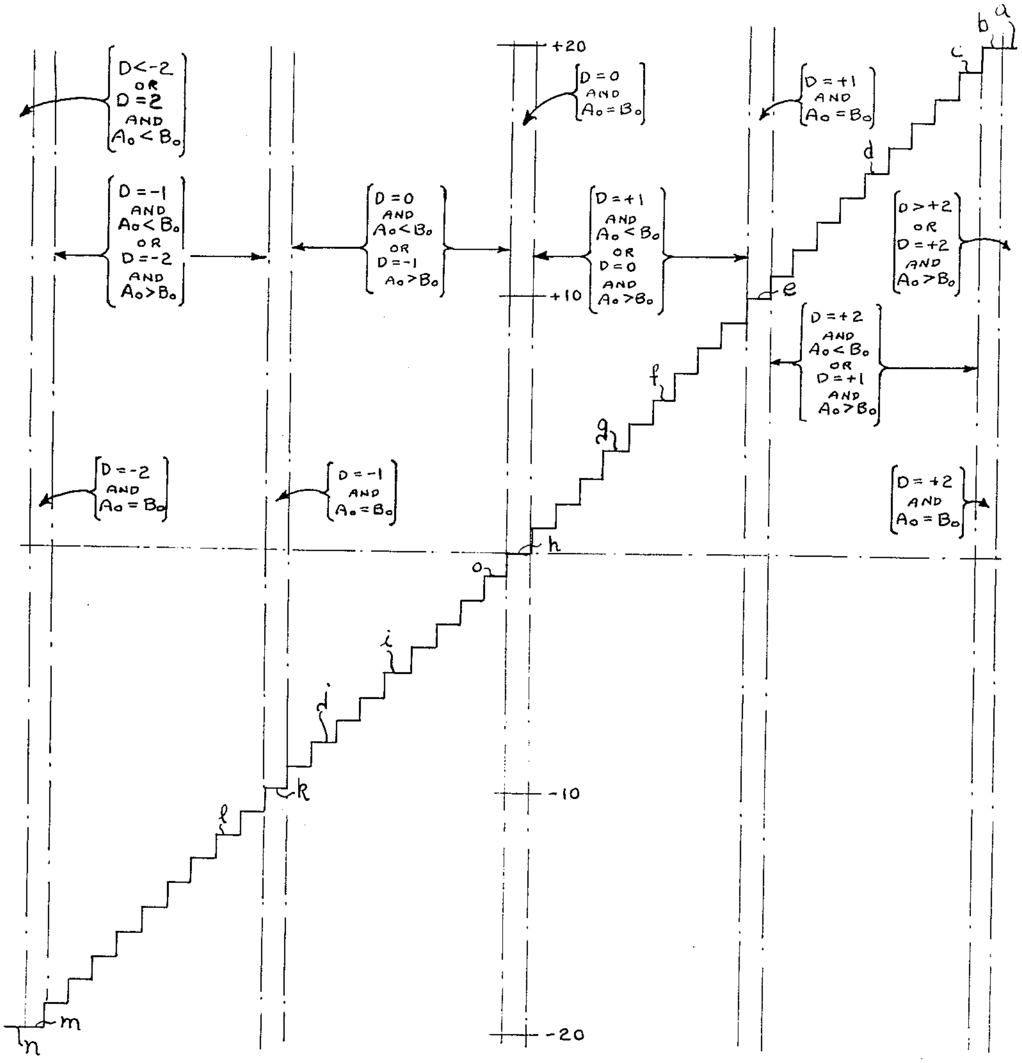
FIGURE 2 is a graph of the output signal versus error detection of the form of our digital comparator shown in FIGURE 1.

Referring to FIGURE 2 we have shown a graph of the outer error signal versus the error of our comparator. We have indicated respective points on the graph by the reference characters *a* to *o*. In Table I below we have shown the resistors connected in the circuits of the halves of winding 38 to give the correct current for these various points.

*Table I*

| No. | Digits | | | | Condition | Circuit to resistor components | Resistors | | Pt. |
|---|---|---|---|---|---|---|---|---|---|
| | $X_3$ | $X_2$ | $X_1$ | $X_0$ | | | Upper | Lower | |
| A 1000 | 1 | 0000 | 0000 | 0000 | D>+2 | 12a, 11c, 10m, 8c, 7a to 72 | 102 | ----- | a |
| B 0956 | 0 | 1001 | 0101 | 0110 | | | | | |
| A 1000 | 1 | 0000 | 0000 | 0000 | D=+2 | 12a, 11c, 10m, 8c, 7c, 6m | ----- | ----- | c |
| B 0981 | 0 | 1001 | 1000 | 0001 | $A_0<B_0$ | 4c to 74; 0h and 230 to 204-0a on | 102 | 198 | |
| A 1000 | 1 | 0000 | 0000 | 0000 | D=+2 | 12a, 11c, 10m, 8c, 7c, 6m, 4c to 74 | 102 | ----- | b |
| B 0980 | 0 | 1001 | 1000 | 0000 | $A_0=B_0$ | | | | |
| A 1001 | 1 | 0000 | 0000 | 0001 | D=+2 | 12a, 11c, 10m, 8c, 7c, 4c to 74; 0e to 218; 6m | 102 | ----- | a |
| B 0980 | 0 | 1001 | 1000 | 0000 | $A_0>B_0$ | | | | |
| A 1000 | 1 | 0000 | 0000 | 0000 | D=+1 | 12a, 11c, 10m, 8c, 7c, 6m, 4d to 76; 208 to 200; 2c and 1c on | 148 | 194 and 196 | g |
| B 0996 | 0 | 1001 | 1001 | 0110 | $A_0<B_0$ | | | | |
| A 0800 | 0 | 1000 | 0000 | 0000 | D=+1 | 12f, 11d, 10c, to 7c, 6m, 4d to 76 | 148 | ----- | e |
| B 0790 | 0 | 0111 | 1001 | 0000 | $A_0=B_0$ | | | | |
| A 1005 | 1 | 0000 | 0000 | 0101 | D=+1 | 12a, 11c, 10m, 8c, 7c, 6m, 4d to 76; 208 to 200; 2a and 0a on | 148 | 158 and 162 | d |
| B 0990 | 0 | 1001 | 1001 | 0000 | $A_0>B_0$ | | | | |
| A 1091 | 1 | 0000 | 1001 | 0001 | D=0 | 12e, 11f to 8f, 7e, 6f, 5f, 4f to 78; 210 to 200; 2c on | ----- | 194 | i |
| B 1096 | 1 | 0000 | 1001 | 0101 | $A_0<B_0$ | | | | |
| A 1090 | 1 | 0000 | 1001 | 0000 | D=0 | 12e, 11f to 8f, 7e, 6f, 5f and 4f to 78 | ----- | ----- | h |
| B 1090 | 1 | 0000 | 1001 | 0000 | $A_0=B_0$ | | | | |
| A 1096 | 1 | 0000 | 1001 | 0101 | D=0 | 12e, 11f to 8f, 7e, 6f, 5f, 4f to 78; 210 to 200; and 0a on and 2a on | 158 and 162 | ----- | f |
| B 1090 | 1 | 0000 | 1001 | 0000 | $A_0>B_0$ | | | | |
| A 0092 | 0 | 0000 | 1001 | 0010 | D=−1 | 12f to 9f, 8g, 7h, 6n, 4i to 80; 212 to 200; 1a and 2c on | 160 | 155 and 194 | l |
| B 0104 | 0 | 0001 | 0000 | 0100 | $A_0<B_0$ | | | | |
| A 0092 | 0 | 0000 | 1001 | 0010 | D=−1 | 12f to 9f, 8g, 7h, 6n, 4i to 80 | ----- | 155 | k |
| B 0102 | 0 | 0001 | 0000 | 0010 | $A_0=B_0$ | | | | |
| A 0094 | 0 | 0000 | 1001 | 0100 | D=−1 | 12f to 9f, 8g, 7h, 6n, 4i to 80; 212 to 200; 2a and 1c on | 158 | 155 and 196 | j |
| B 0102 | 0 | 0001 | 0000 | 0010 | $A_0>B_0$ | | | | |
| A 0080 | 0 | 0000 | 1000 | 0000 | D=−2 | 12f to 9f, 8g, 7h, 6n, 4k to 82 | ----- | 140 | n |
| B 0105 | 0 | 0001 | 0000 | 0101 | $A_0<B_0$ | | | | |
| A 0080 | 0 | 0000 | 1000 | 0000 | D=−2 | 12f to 9f, 8g, 7h, 6n, 4k to 82 | ----- | 140 | m |
| B 0100 | 0 | 0001 | 0000 | 0000 | $A_0=B_0$ | | | | |
| A 0088 | 0 | 0000 | 1000 | 1000 | D=−2 | 12f to 9f, 8g, 7h, 6n, 4k to 82; 3e to 218, 218 and 228 to 202; 3a on | 156 | 140 | l |
| B 0100 | 0 | 0001 | 0000 | 0000 | $A_0>B_0$ | | | | |
| A 0900 | 0 | 1001 | 0000 | 0000 | D<−2 | 12g, 11h, 10n, 8h, 8i to 84 | ----- | 140 | n |
| B 1000 | 1 | 0000 | 0000 | 0000 | | | | | |
| A 0999 | 0 | 1001 | 1001 | 1001 | ----- | 12g, 11h, 10n, 8h, 7h, 6n, 4i to 80; 3a and 0a on | 155 | 156 and 162 | o |
| B 1000 | 1 | 0000 | 0000 | 0000 | | | | | |

so that the actual difference is less than 20 in a positive direction element 204 conducts to provide proportional control.

We connect the conductor 78 corresponding to $D=0$ and the conductor 226 corresponding to $A_0=B_0$ to the control terminals of a two-input AND logic element 232. We connect a terminal 234 through a reverse-biased diode to a source of negative biasing potential of twenty volts, to conductor 78 normally to bias the associated control input terminal of element 232 off. When both conductors 78 and 226 are at ground potential indicating that $D=0$ and $A_0=B_0$ so that the numbers A and B coincide, component 232 conducts to connect its input terminal to the terminal 236 of a source of negative potential of a magnitude of about twenty volts. This coincidence indicating circuit may be used to operate any suitable type of indicator or control device.

As has been explained hereinabove, in the form of our system shown we require proportional control in the range of differences from +20 to −20. Outside of this range either resistor 102 is connected in the circuit of the upper half of winding 88 or resistor 140 is connected We so select the values of the resistors adapted to be connected in the halves of winding 88 to have relative weights of 1, 2, 4, 8, 10, and 20. For example, resistors 102 and 104 can be 1 kilohm resistors and resistors 148 and 156 can be 2 kilohm resistors. The pairs of resistors 156 and 192, 128 and 194, 160 and 196, and 162 and 198 can have respective values of 2.4 kilohms, 5.5 kilohms, 10 kilohms, and 20 kilohms. Thus a difference of $D=\pm 1$ corresponds to an actual difference of ±10 and $D=\pm 2$ corresponds to an actual difference of ±20. In accordance with the disclosure in the copending application referred to hereinabove, we may modify our device to prevent overshoot when approaching a desired condition from one direction.

For purposes of simplicity we have not shown the details of the logic circuit components making up our device. The details of these components are shown and described in the Krause et al. application, referred to hereinabove.

In operation of our comparator we apply the binary bits and complements of the representations of the decimal digits of the number A, for example, which may come from a storage register or the like (not shown) to the components of our system in the manner shown in FIGURE 1. The bits and complements of the number B may come from a suitable device such as an analogue-to-digital converter (not shown). These bits and complements likewise are applied to the control terminals of the logic circuit components in the manner shown in FIGURE 1.

The operation of our comparator to produce a proportional control over the range of differences between +20 and −20 can best be seen by considering a number of specific examples. Let the number A be represented by the groups of binary bits $A_{30}$ $A_{23}A_{22}A_{21}A_{20}$ $A_{13}A_{12}A_{11}A_{10}$ $A_{03}A_{02}A_{01}A_{00}$ and the number B be represented by the group of bits $B_{30}$ $B_{23}B_{22}B_{21}B_{20}$ $B_{13}B_{12}B_{11}B_{10}$ $B_{03}B_{02}B_{01}B_{00}$. Let us assume first that the number $A=1000$ 0000 0000 and $B=0981=0$ 1001 1000 0001 so that $A-B=19$ with $D=+2$ and $A_0<B_0$. As is shown in Table I above, with these values for A and B a circuit is complete from conductor 10 through components 12*a*, 11*c*, 10*m*, 8*c*, 7*c*, 6*m*, and 4*c* to conductor 74 including that $D=+2$. Thus component 104 is rendered conductive to connect resistor 102 in the upper half of winding 88. At the same time component 144 is not conductive and all of the components 3*a* to 0*a* are turned off. A circuit is also complete through conductor 208 to OR circuit 206 to enable component 200 of the lower winding half group of components. Neither component 134 nor component 150 is rendered nonconductive and all the components 3*c* to 0*c*, except component 0*c*, are turned off. As a result, resistor 198 is connected in the lower half of the winding 88. From the resistance value of 1 kilohm for resistor 102 and assuming a signal having a swing of twenty volts applied to the center tap 90, it will be seen that a current having a magnitude of approximately twenty milliamperes flows upwardly through the upper half of winding 88. At the same time with a value of twenty kilohms for resistor 198, a current of 1 milliampere flows downwardly through the lower half of winding 88. The net current flow in winding 88 is 19 milliamperes upwardly corresponding to the correct difference $A-B=+19$.

By way of a second example let us consider the case in which the number $A=0094=0$ 0000 1001 0100 and $B=0102=0$ 0001 0000 0010 so that $A-B=-8$ with $D=-1$ and with $A_0>B_0$. With these conditions a circuit is complete from conductor 10 through components 12*f*, to 9*f*, 8*g*, 7*h*, 6*n* and 4*l* to conductor 80 indicating $D=-1$. Thus component 150 is enabled to connect resistor 155 in the circuit of the lower half of winding 88. At the same time component 200 is enabled through conductor 212 and all the remaining components of the low order section are off except components 2*a* and 1*c*. Thus we have resistors 155 and 196 in parallel with each other in the lower winding half circuit, and we have resistor 158 in the upper winding half circuit. Thus with values of 2 kilohms and 10 kilohms respectively for resistors 155 and 196, a current of 12 milliamperes flows downwardly through the lower half of winding 12. At the same time with a resistance value of 5 kilohms for resistor 158, a current of 4 milliamperes flows upwardly through the upper half of winding 88. The net current flow in winding 88 is 8 milliamperes downwardly through the winding 88, correctly indicating a difference of $A-B=-8$.

The remaining examples given in Table I above may be traced through our comparator in a similar manner. It will be seen that in each instance in which a difference of 1 is applied to a group of components corresponding to a decimal digit, our comparator provides a path for this difference as long as a 9 appears opposite to a 0 in the decimal digit place. Thus our system can operate properly in a binary-coded decimal system.

For purpose of simplicity and for clarity of exposition we have not shown the details of the logic circuit component making up our comparator. The specific nature of these components is set forth in the Krause et al. application referred to hereinabove.

It will be seen that we have accomplished the objects of our invention. We have provided a digital comparator for use in a binary-coded decimal system. Our comparator operates continuously and does not require the use of sampling techniques such as are employed in the prior art. Our comparator is relatively simple, inexpensive, and rugged for the result achieved. We may readily expand our system to accommodate a large number of decimal places.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A comparator for determining the difference between a pair of binary-coded decimal numbers whose digits in places of significance from most to least significant are represented by groups of binary bits and complements including in combination respective means responsive to the groups of bits and complements representing the digits of said numbers in corresponding places of significance from the most significant to the next-to-least significant place for producing a decision signal indicating the difference between said numbers in places of significance from the most significant to the next-to-least significant place and means responsive to said decision signal and to the groups of bits and complements representing the digits of said numbers in the least significant place for producing an analogue representation of the difference between said numbers.

2. In a comparator for determining the difference between a pair of binary-coded decimal numbers whose digits in places of significance from most to least significant are represented by groups of binary bits and complements, means responsive to the groups of bits and complements representing the number digits in a certain place for producing a decision signal representing that the first number is greater than the second number by "one" in said certain place, means responsive to the groups of bits and complements representing the number digits in places of lesser significance than said certain place for providing a path for said decision signal as long as said first number digit is a "zero" and said second number digit is a "nine" in said places of lesser significance.

3. In a comparator for determining the difference between a pair of binary-coded decimal numbers whose digits in places of significance from most to least significant are represented by groups of binary bits and complements, a plurality of logic circuit components corresponding to a number place of intermediate significance, said plurality of components including component groups corresponding respectively to the bit places of significance of the representations of said numbers in said intermediate significance place, the group corresponding to the most significant bit place of said number place of intermediate significance including a certain component adapted to be enabled in response to the presence of both a binary "one" in the most significant complement place of the digit of the first number of said pair in said place of intermediate significance and a binary "one" in the most significant bit place of the digit of the second number of said pair in said place of intermediate significance, a bypass component for connecting said certain component to a particular component of the group corresponding to the least significant bit place in response to the presence of binary "zeros" both in the first number intermediate digit bit place of next-to-most significance and in the first number intermediate digit bit place of next-to-least significance, said particular component of the least significant group being enabled in response to the presence both of a "zero" in the first number intermediate digit least significant bit place and of a "one" in the second number intermediate digit least significant bit place.

4. In a comparator for determining the difference between a pair of binary-coded decimal numbers whose digits in places of significance from most to least significant are represented by groups of binary bits and complements, a plurality of logic circuit components corresponding to a number place of intermediate significance, said plurality of components including component groups corresponding respectively to the bit places of the representations of said numbers in said intermediate significant place, the group corresponding to the most significant bit place of said number place of intermediate significance including a certain component adapted to be enabled in response to the presence of both a binary "one" in the most significant complement place of the digit of the first number of said pair in said place of intermediate significance and a binary "one" in the most significant bit place of the digit of the second number of said pair in said place of intermediate significance, a component for connecting said certain component to a particular component of the group corresponding to the least significant bit place in response to the presence of binary "zeros" both in the first number intermediate digit bit place of next-to-most significance and in the first number intermediate digit bit place of next-to-least significance, said particular component of the least significant group being enabled in response to the presence of a "one" in the first number intermediate digit least significant bit place and in response to the presence of a "zero" in the second number intermediate digit least significant bit place.

5. In a comparator for determining the difference between a pair of binary-coded decimal numbers whose digits in places of significance from most to least significant are represented by groups of binary bits and complements, a plurality of logic circuit components corresponding to a number place of intermediate significance, said plurality of components including component groups corresponding respectively to the bit places of the representations of said numbers in said intermediate significance place, the group corresponding to the most significant bit place of said number place of intermediate significance including a certain component adapted to be enabled in response to the presence of both a binary "one" in the most significant complement place of the digit of the first number of said pair in said place of intermediate significance and a binary "one" in the most significant bit place of the digit of the second number of said pair in said place of intermediate significance, an output component adapted to be enabled in response to the presence of a binary "one" in the first number intermediate digit bit place of next-to-most significance and in response to the presence of a binary "one" in the first number intermediate digit bit place of next-to-least significance and means for connecting intermediate significance and a binary "one" in the most significant bit place of said second number digit in said place of intermediate significance, a by-pass component for connecting said certain component to a particular component of the group corresponding to the least significant bit place of said number place of intermediate significance in response to the presence of binary "zeros" both in the first number intermediate digit bit place of next-to-most significance and in the first number intermediate digit bit place of next-to-least significance, said particular component of the least significant group being enabled in response to the presence both of a "zero" in the first number intermediate digit least significant bit place and of a "one" in the second number intermediate digit least significant bit place, an output component adapted to be enabled in response to the presence of said certain component to said output component.

6. In a comparator for determining the difference between a pair of binary-coded decimal numbers whose digits in places of significance from most to least significant are represented by groups of binary bits and complements, a plurality of logic circuit components corresponding to a number place of intermediate significance, said plurality of components including component groups corresponding respectively to the bit places of the representations of said numbers in said intermediate significant place, the group corresponding to the most significant bit place of said number place of intermediate significance including a certain component adapted to be enabled in response to the presence of both a binary "one" in the most significant complement place of the digit of the first number of said pair in said place of a binary "one" in the first number intermediate digit place of next-to-most significance and in response to the presence of a binary "one" in the first number intermediate digit bit place of next-to-least significance and means connecting said certain component to said output component.

References Cited in the file of this patent

UNITED STATES PATENTS 2,923,476 Ketchledge ............ Feb. 2, 1960